(No Model.)

C. A. YONT.
CULTIVATOR.

No. 361,476. Patented Apr. 19, 1887.

Witnesses:
J. M. Campbell
Jas. T. Self

Inventor.
Chas. A. Yont.

UNITED STATES PATENT OFFICE.

CHARLES A. YONT, OF NEAR TALMAGE, NEBRASKA.

CULTIVATOR.

SPECIFICATION forming part of Letters Patent No. 361,476, dated April 19, 1887.

Application filed January 13, 1887. Serial No. 224,309. (No model.)

*To all whom it may concern:*

Be it known that I, CHARLES A. YONT, a citizen of the United States, residing near Talmage, in the county of Otoe and State of Nebraska, have invented a new and useful Cultivator-Steering Device, of which the following is a specification.

This invention relates to cultivators of that class in which the plow-gangs are arranged to cultivate both sides of a row simultaneously, and are drawn by a frame mounted on wheels the axles of which are hinged so that said wheels may be turned obliquely to the frame for the purpose of changing the direction of the path of the wheels when the cultivator is in operation.

The objects of my improvements are, first, to provide novel means whereby the operator may deflect both wheels on the frame, and thereby change the direction of the path of the machine by the united lateral motion of both plow-beams; second, to provide a device by which the wheels are not deflected on the frame when said plow-beams are moved apart or brought together. I attain these objects by the mechanism shown in the accompanying drawings, in which—

Figure 1:
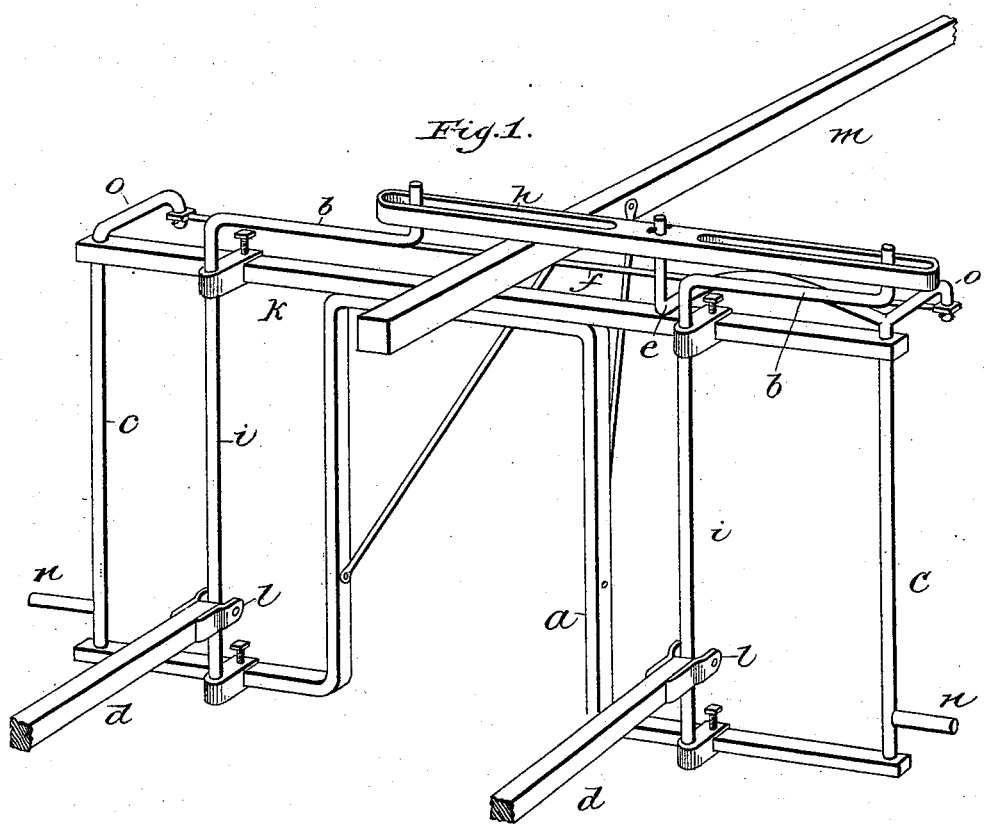
Figure 2:
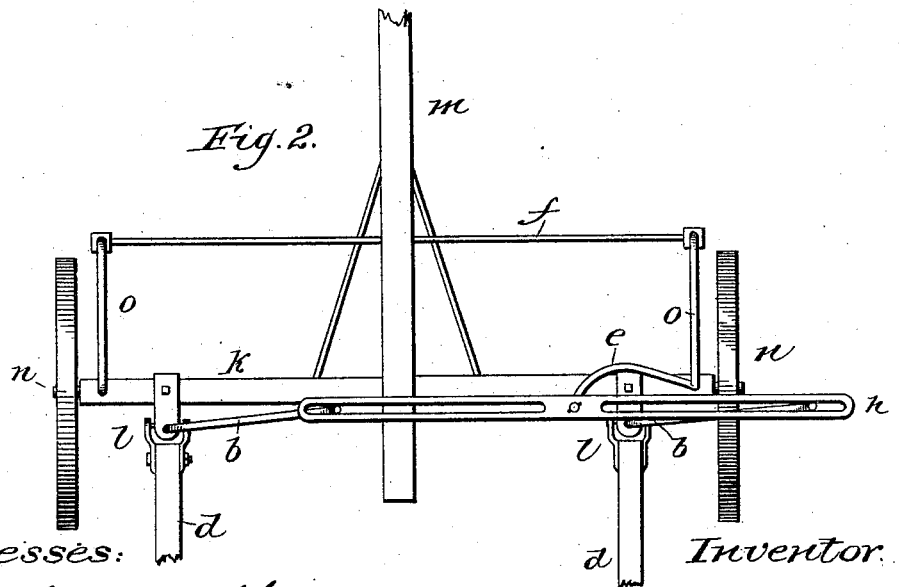

Figure 1 is a perspective view of the entire machine. Fig. 2 is a top view of the same.

The arch $a$, in connection with the cross-bar $k$, constitutes the main frame of the machine. The spindles $n$ $n$ are welded to the upright rods $c$ $c$. These rods are connected through their cranks $o$ $o$ by the rod $f$, thereby holding the wheels parallel to each other at all times.

The shovel-beams $d$ $d$ are jointed to the upright crank-rods $i$ $i$ by the couplings $l$ $l$, which allow a free up-and-down motion; but all lateral motion of said beams is transmitted to their respective crank-rods. The cranks $b$ $b$ of these rods work in the slots of the equalizing-lever $h$. This lever in turn controls the deflection of the spindles $n$ $n$ through the crank $e$, which is rigidly connected to the upright rod $c$ at the right side of the cultivator.

An examination of the drawings will show that if the plow-beams are both moved to the same side—for instance, to the right—the cranks $b$ $b$ will both move forward, carrying with them the equalizing-lever $h$, and turning the crank $e$, on which said lever is pivoted, to the right, thus turning both axles, so as to run the frame to the right, and thereby aid the movement given to the gangs by the operator to get around plants that are out of line; but if the plow-beams are moved in opposite directions their cranks $b$ $b$ also will move in opposite directions. This opposite motion of the cranks is neutralized by the slotted lever $h$. For instance, if the plow-beams are moved apart, the right crank $c$ moves forward, while the left crank $c$ moves backward. This, it will be seen, holds the crank $e$ and the center of the lever $h$ stationary. When the plow-beams are drawn together, the effect is the same, except that the right crank $c$ moves backward, while the left moves forward, thus turning the lever $h$ in the opposite direction, but still holding the crank $e$ and the axles $n$ $n$ stationary.

By the use of this device, when the operator spreads the plow-beams apart to get around scattered hills or brings them together to plow the center, the wheels are not unnecessarily deflected, as they would be if controlled by one plow-beam alone.

The construction and arrangement of the parts shown and described produces a cultivator which is materially improved in its operation, and by which arrangement the labor of deflecting the wheels is equally divided between the plow-beams, thereby making the labor of the operator easier and increasing the effectiveness of the work done by the shovels.

I am aware that prior to my invention cultivators have been made with a steering device. Therefore I do not claim such a combination, broadly; but What I do claim as my invention, and desire to secure by Letters Patent, is—

1. The combination, in a cultivator-frame, with the plow-beams $d$ and crank-rods $i$, of the slotted equalizing-lever $h$, the crank-standards $c$, carrying wheel-spindles $n$, and the crank-pivot $e$, whereby the deflection of the wheels is caused and controlled by the plow beams or handles, substantially as described.

2. The combination, in a steering device for a wheel-cultivator, with the plow-beams, of the swiveled rods $i$, having cranks $b$, the lever $h$, in the slots of which said cranks work, the crank $e$, forming a central pivot to lever $h$, the crank-standards $c$ having the wheel-spindles, and to one of which the crank $e$ is rigidly attached, and the connecting-rod $f$, whereby the movements of both plows in one direction will deflect the wheels, while the opposite motion of each beam will neutralize the other and prevent deflection of the wheels, substantially as shown and described.

CHAS. A. YONT.

Witnesses:
J. M. CAMPBELL,
THOS. M. SELF.